Oct. 28, 1952     A. N. BUTZ, JR     2,615,778

MEANS FOR MULTIPLE RECORDING ON FILM

Filed July 16, 1948     5 Sheets-Sheet 1

INVENTOR.
ARTHUR NELSON BUTZ, JR., DECEASED
BY John B. Brady
ATTORNEY

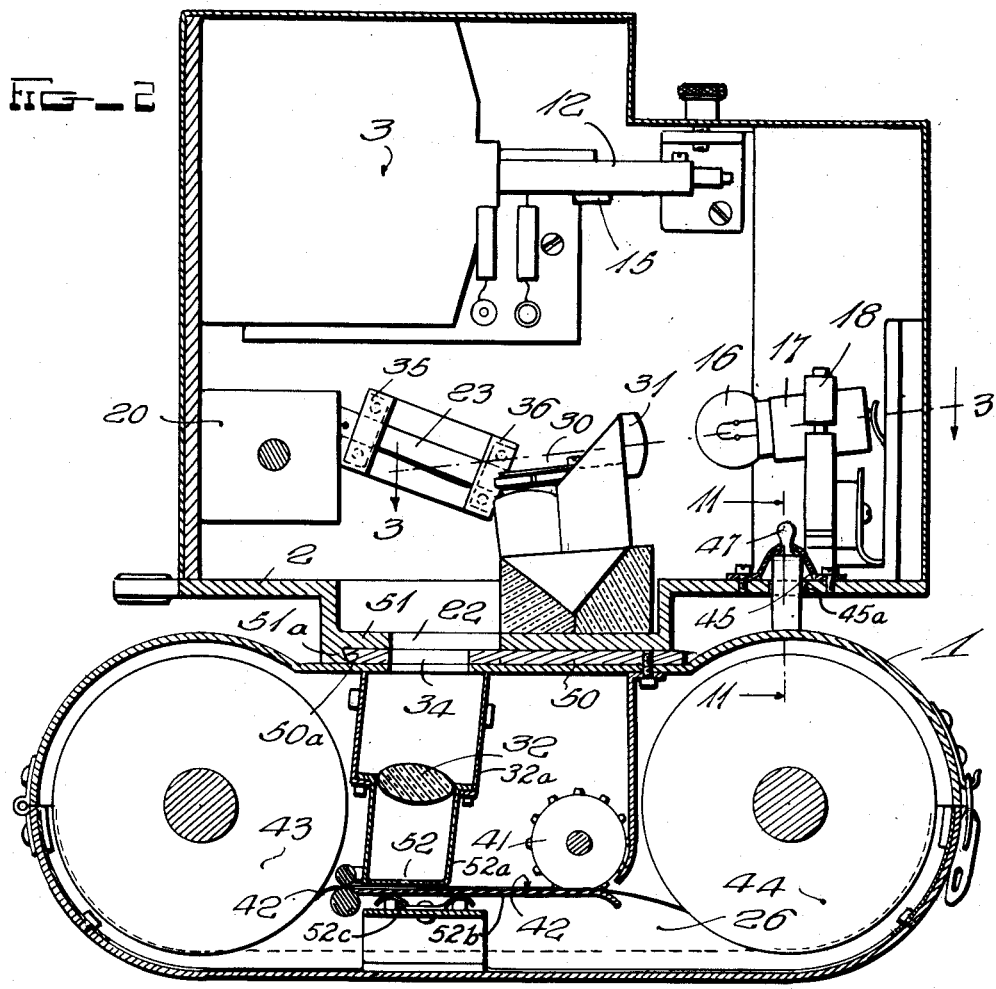

| | | | |
|---|---|---|---|
| GREEN → | —··—··—··— | ▨▨▨ | 53 |
| BROWN → | —···—···— | ▨▨▨ | 54 |
| ORANGE → | ▬▬▬▬▬ | ▨▨▨ | 55 |
| RED → | — — — — — | ▨▨▨ | 56 |
| PURPLE → | ············· | ▨▨▨ | 57 |
| BLUE → | — — — — | ▨▨▨ | 58 |

INVENTOR.
ARTHUR NELSON BUTZ, JR., DECEASED
BY
John B. Grady
ATTORNEY

Oct. 28, 1952     A. N. BUTZ, JR     2,615,778
MEANS FOR MULTIPLE RECORDING ON FILM
Filed July 16, 1948     5 Sheets-Sheet 4
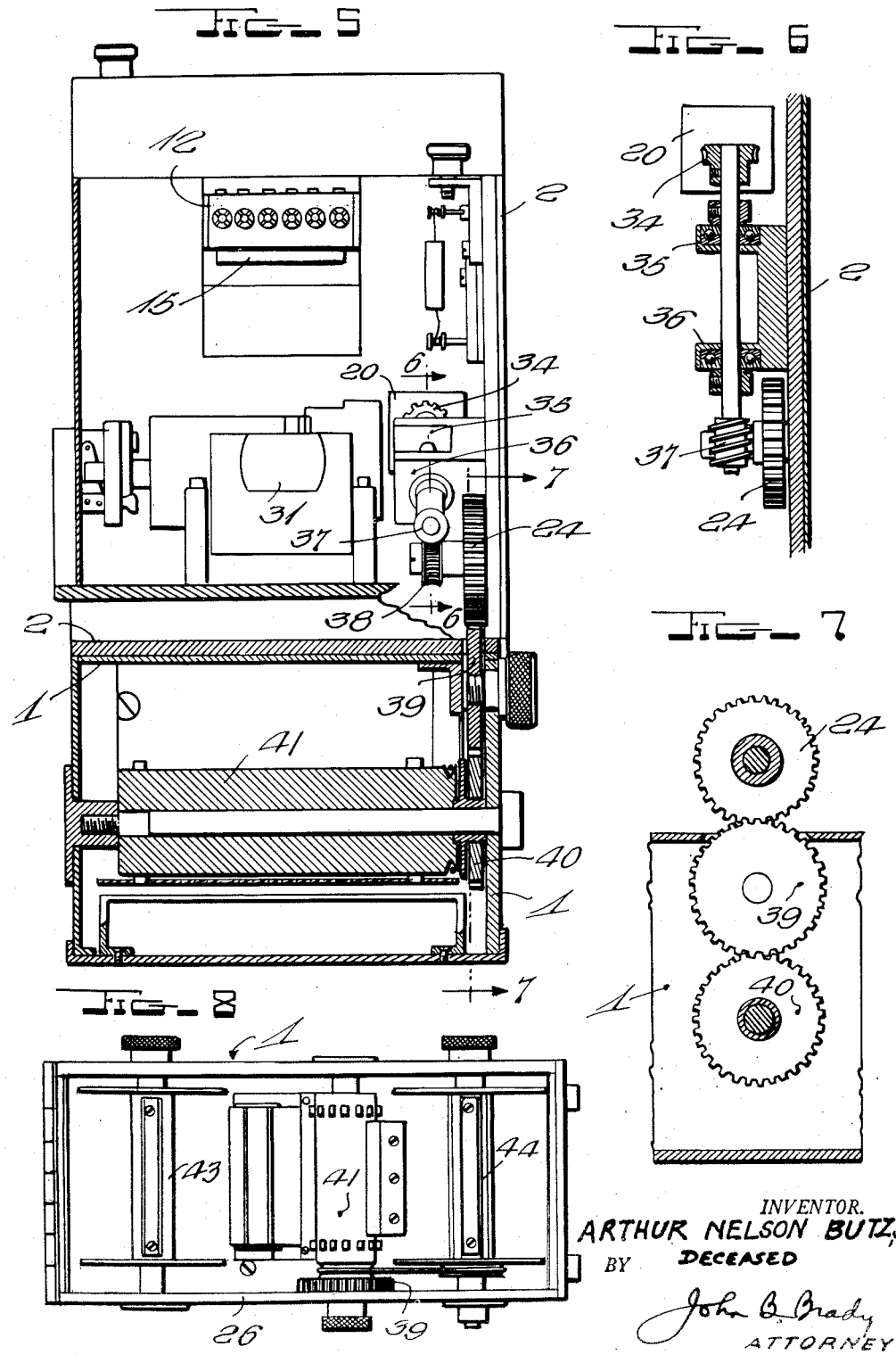
INVENTOR.
ARTHUR NELSON BUTZ, JR.,
DECEASED
BY
John B. Brady
ATTORNEY Oct. 28, 1952  A. N. BUTZ, JR  2,615,778
MEANS FOR MULTIPLE RECORDING ON FILM
Filed July 16, 1948  5 Sheets-Sheet 5
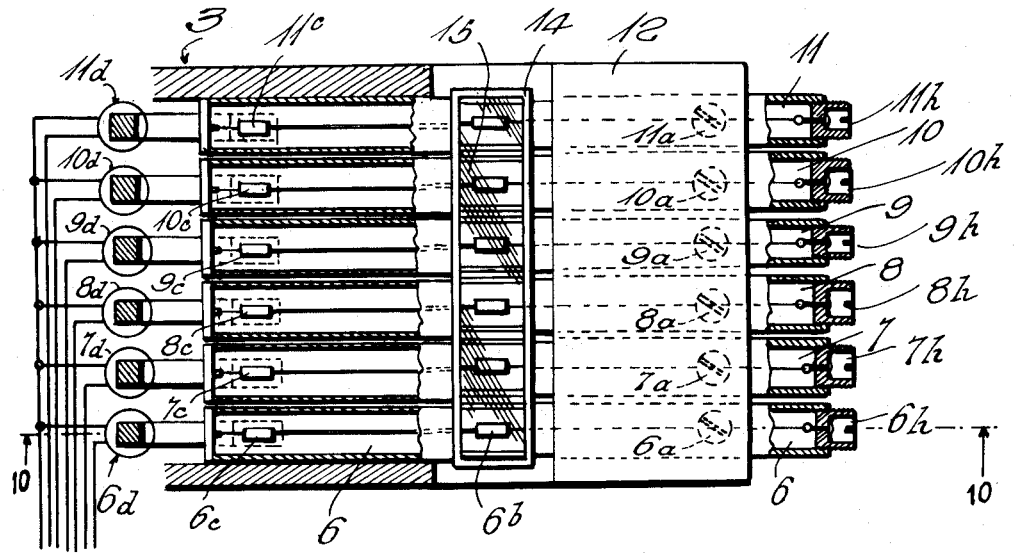
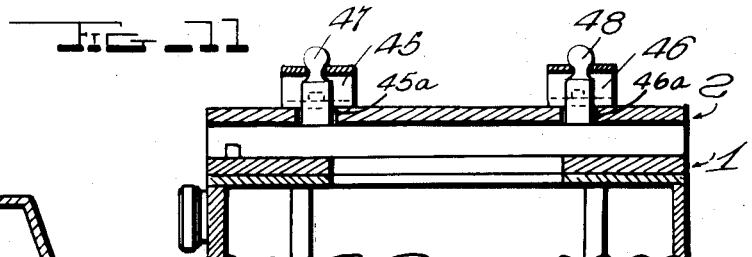
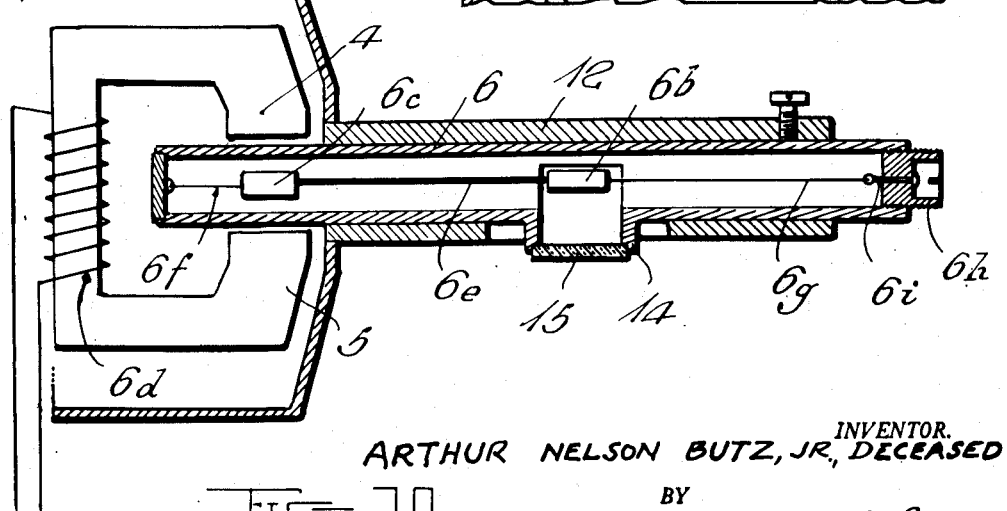
INVENTOR.
ARTHUR NELSON BUTZ, JR., DECEASED
BY John B. Brady
ATTORNEY Patented Oct. 28, 1952

2,615,778

UNITED STATES PATENT OFFICE 2,615,778

MEANS FOR MULTIPLE RECORDING ON FILM

Arthur Nelson Butz, Jr., deceased, late of State College, Pa., by Arthur N. Butz, executor, Maplewood, N. J., assignor, by mesne assignments, to Pennsylvania Research Corporation, a corporation of Pennsylvania Application July 16, 1948, Serial No. 39,035

4 Claims. (Cl. 346—109)

This invention relates broadly to recording apparatus and more particularly to multiple wave trace recording on color film.

One of the objects of the invention is to provide a compact oscillograph and photographic unit for simultaneously recording multiple light traces on color film representing simultaneously varying currents in a multiplicity of coacting channels.

Another object of the invention is to provide a method of recording on color film wave traces of a multiplicity of related variables whereby the curves reproduced in contrasting color for eliminating confusion often result in endeavoring to trace the continuity of the several curves.

Still another object of the invention is to provide an improved construction of photographic recording and oscillograph apparatus with means for driving a color film at a predetermined speed for simultaneously recording a multiplicity of correlated variables in the form of wave traces of contrasting colors on the film.

Still another object of the invention is to provide an improved oscillograph for multiple channel operation having means for ready attachment with and detachment from a color film camera with film driving means carried by the oscillograph and geared for driving the color film in the film magazine of the color film camera for coaction with the multiple channel oscillograph.

Figure 1:
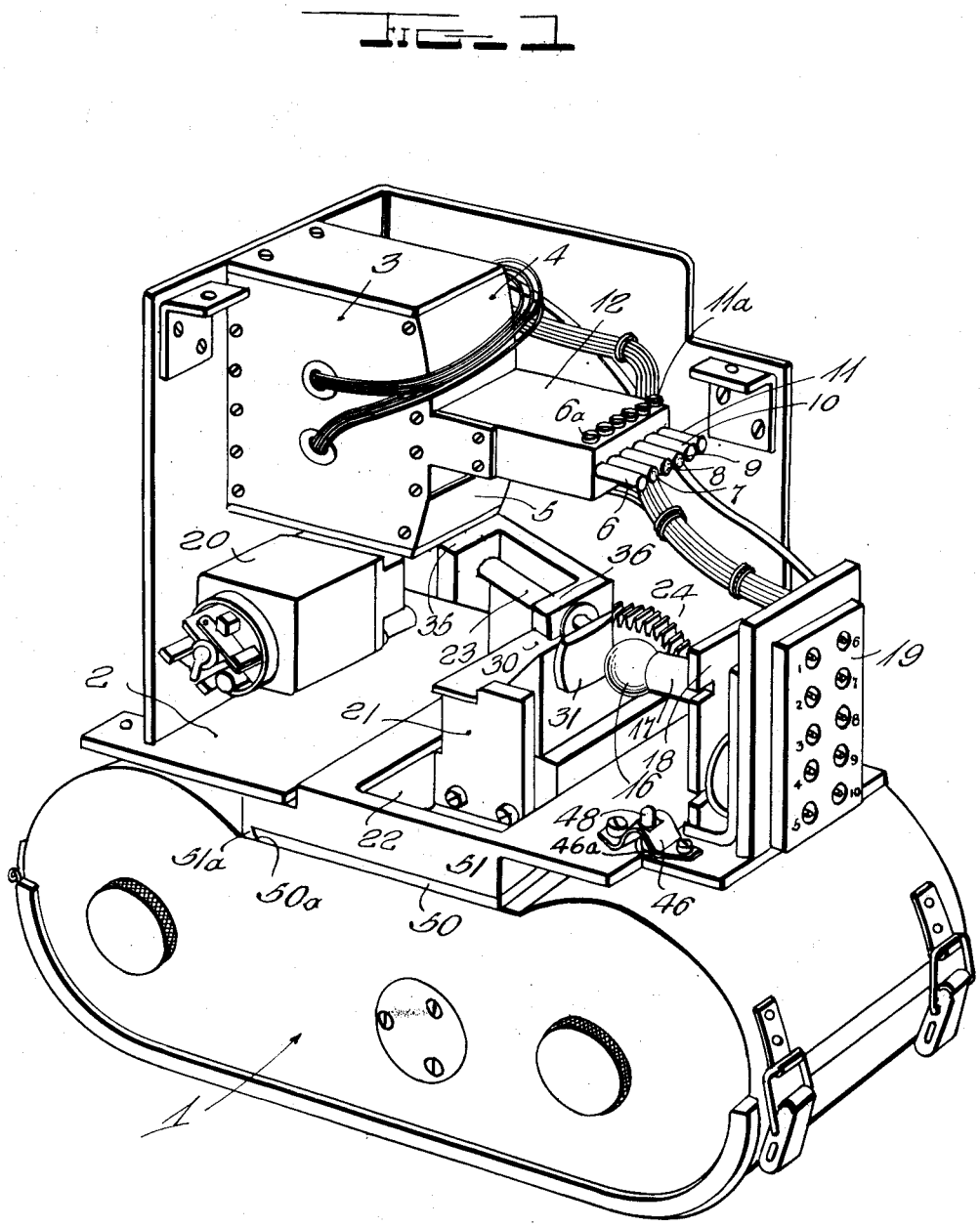
Figure 12:
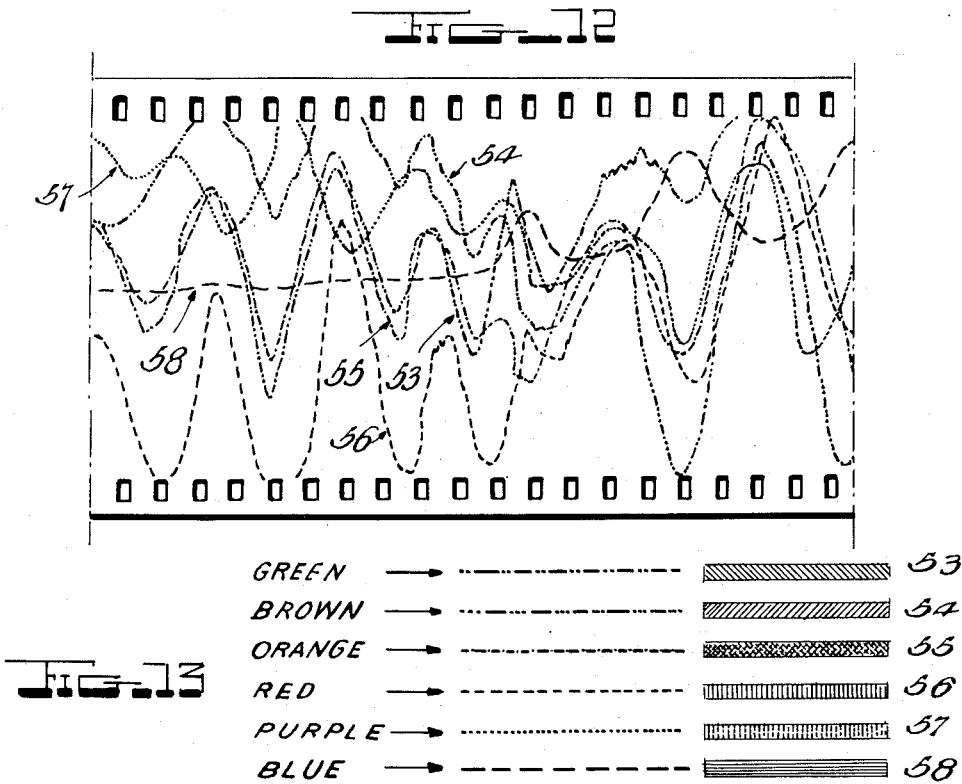
Figure 13:
Figure 4:
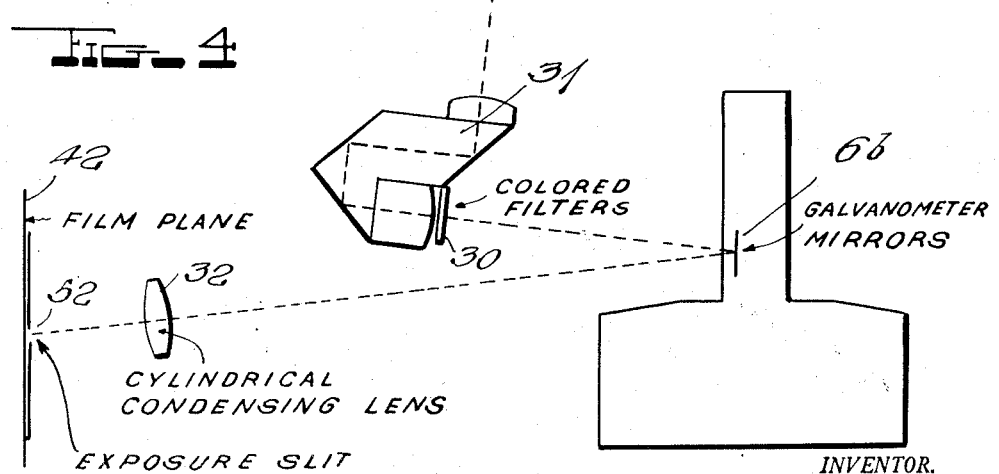

Other and further objects of the invention reside in the multiple channel color film oscillograph recording system set forth more fully in the specification hereinafter following by reference to the accompanying drawings, in which:

Figure 1 is a perspective view of the multiple oscillograph with the casing thereof broken away to show the interior arrangement of the parts and illustrating the association of the oscillograph with the color film camera; Fig. 2 is a vertical sectional view taken through the multiple channel oscillograph and through the color film camera associated therewith; Fig. 3 is a fragmentary transverse sectional view taken substantially on line 3—3 of Fig. 2 and showing the arrangement of color filters associated with the optical system of the oscillograph; Fig. 4 is a diagrammatic and schematic view of the light distribution system through the oscillograph and color film camera for simultaneously recording a multiplicity of variables in the multiple channel system of the invention; Fig. 5 is a vertical sectional view taken through the oscillograph and the camera associated therewith, with parts of the oscillograph broken away and illustrating the driving means for driving the color film in the film magazine of the color film camera from the mechanism within the oscillograph; Fig. 6 is a fragmentary sectional view taken substantially on line 6—6 of Fig. 5 and showing the gear system for transmitting the driving torque from the driving motor within the oscillograph to the film moving mechanism in the film magazine of the color film camera; Fig. 7 is a fragmentary vertical sectional view taken substantially on line 7—7 of Fig. 5 and showing the gear train for transmitting film driving torque from the film camera means within the oscillograph to the film driving mechanism within the film magazine of the color film camera; Fig. 8 is a plan view of the film magazine with the cover removed and detached from the galvanometer illustrated in the assembly view of Fig. 5 and showing the film driving mechanism within the film magazine of the color film camera; Fig. 9 is a fragmentary schematic view of the under side of the oscillograph showing the multiplicity of optical mirrors therein for independently controlling light means which are focused upon the optical system of the color film camera; Fig. 10 is a fragmentary vertical sectional view taken substantially on line 10—10 of Fig. 9 and illustrating particularly the association of the electromagnetic operating system with the magnetic systems controlling the optical mirrors of the multiple channel oscillograph; Fig. 11 is a fragmentary transverse sectional view taken substantially on line 11—11 of Fig. 2 and showing the attachment means between the color film camera and the casing of the oscillograph; Fig. 12 is an elevational view of a fragmentary portion of a film after it has passed through the color film camera showing the multiplicity of wave traces thereon in different contrasting color designations; and Fig. 13 is a color code chart designating the contrasting colors in which the several curves recorded on the film of Fig. 12 appear in view of the impossibility of illustrating in a patent drawing the contrasting colors which are normally reproduced directly on the film as illustrated in Fig. 12.

The invention is directed to a multiple channel oscillograph utilizing color film in such manner that a multiplicity of variables may be simultaneously recorded on the film producing wave traces which are contrastingly colored. The continuity of the several wave traces may thus be very accurately followed eliminating the indefiniteness which often results when attempt is made to follow a plurality of curves photographically reproduced on a film. Because of the fact that all of the curves resulting from a multiple channel recording are generally reproduced with equal width on the photographic record, these curves, wherever they may cross, introduce elements of indefiniteness as it becomes almost impossible to properly identify the paths the individual curves are intended to follow from the points of juncture. Photographic recorders heretofore available have involved many disadvantages among which may be mentioned:

1. Simultaneous recording of more than one variable is limited by either (a) a loss of resolution due to a lack of individual trace identification; (b) a loss of accuracy caused by restricting each variable to a small portion of the recording medium; or (c) a loss of detail caused by assigning a definite trace width, modulation, or other coding to each of the variables.

2. Excessive size.

3. High-frequency response has been sacrificed for high sensitivity, or vice versa.

4. High-capacity power supply required.

The recorder of this invention overcomes these limitations.

The instrument of this invention utilizes 70-mm. photographic film as the recording medium; the obvious difficulty of analyzing several overlapping traces on standard black-and-white film being circumvented by the use of color film and a separate color for each of the traces. This allows the entire width of the film to be used by each trace, which in turn enhances both resolution (precision) and accuracy.

The instrument is capable of recording four signals each of which is of the order of ten microvolts with reference to the threshold sensitivity of the over-all system including both the oscillograph and the related electronic amplifiers. A figure for the mean detectable variation in signal would be slightly less than 500 microvolts or that voltage required to deflect the light spot on the film approximately ½ mm. The instrument is able to follow time variations occurring at frequencies up to 200 cps. Six signals may be recorded, although in the particular system illustrated only four are independent, the other two being different signals.

In certain types of analysis it is desirable to determine a statistical correlation factor between the fluctuations in adjacent channels. To facilitate the determination of the degree of correlation, it is desirable to record the differences between incoming signals as well as the level of each signal; the recorder is, therefore, equipped to record and identify six traces.

The primary consideration in the development of the galvanometer oscillograph of this invention was a minimum of size consistent with intelligibility of the record and over-all reliability. Color film is utilized so that each trace employs the entire width of the film and is still readily distinguishable from neighboring traces. A fast 70-mm. color film is utilized such as designated at 6—11 Eastman Kodak Company Koda-Color Aero Film which has the fastest emulsion (Weston rating of 32) of several films considered.

Referring to the drawings in detail, Fig. 1 is a perspective view showing the assembly of the galvanometer system with the color film camera system. The color film camera has been indicated by reference character 1 including a casing substantially conforming in contour with the peripheral limits with the casing 2 of the multiple-channel oscillograph and detachably associated with the structural assembly of the oscillograph. The oscillograph includes the galvanometer system shown in perspective view by reference character 3 in Fig. 1 and shown in more detail in Figs. 9 and 10. The galvanometer system includes a housing 12 which provides a support for a multiplicity of cylindrical housings 6—11 each of which enclose an adjustable suspension including mirrors 6b—11b associated with moving coil members or armatures 6c—11c controlled by the electromagnetic system 6d—11d of the galvanometer. The heart of the oscillograph is the multiple element moving coil galvanometer designated at 6—11 containing cylindrical mirrors having radii of curvature of 11½" and an open-circuit sensitivity of 8.2 degrees per milliampere. In this application the galvanometer elements are optimally damped with 14-ohm resistors, resulting in a frequency response that is flat to within one db from 0 to 200 cps. and falls off at the rate of six db per octave above this point. The net sensitivity of the elements is then four degrees per milliampere. The magnetic pole pieces for the individual channels of the galvanometer system are represented at 4 and 5 between which the moving coils 6c—11c of the galvanometer suspensions are controlled. The individual galvanometer suspensions are enclosed for ease of replacement and zero adjustment in non-magnetic cylindrical housings indicated by reference characters 6 to 11 inclusive, within oscillograph housing 12, said oscillograph housing having screw-threaded apertures in one side thereof which receive individual set screws 6a to 11a by which the cylindrical housings and the mirror and armature assemblies therein may be locked in selected positions. The suspensions include a rod interconnection between each mirror and armature assembly as indicated at 6e between armature 6c and mirror 6b with thread suspensions at 6f between the end of the cylindrical housing 6 and armature 6c and thread suspension 6g between mirror 6b and the adjusting screw plug 6h screw-threaded into the end of the cylindrical housing 6. It will be noted that adjusting screw plug 6h is in the form of a swivel with link 6i passing therethrough so that endwise tension may be applied to the suspension without twisting the mirror 6b out of a predetermined angular position. Similar adjustments 7h—11h are provided for each of the other mirror suspension assemblies.

The under side of the housing 12 includes an elongated slot represented at 14 through which the individual mirrors attached to the galvanometer suspensions are visible as represented at 6b through 11b. The slot 14 is closed by a window 15 through which light is directed from the color filter system represented at 30.

Light is supplied to the galvanometer in the form of separately-colored collimated light beams, one for each element. This procedure permits placing the exposure plane at the focal point of the cylindrical mirrors (5¾") and allows further space conservation since the film spools may be placed in the space between the collimator and the exposure plane. The use of the prism system 31 allows the light source 16 to be placed out of the path of the galvanometer beam and permits placing the bulb 16 in a readily-accessible location without increasing the size of the case. It will be noted that the color filters are placed directly after the lens-prism unit 31 so that the light beam for each element passes through the filters only once before being reflected by the galvanometer mirrors. The use of a line filament lamp eliminates the necessity for a condenser and slit system to produce the desired line source. A brighter image is achieved by inserting a cylindrical condensing lens 32 just before the exposure plane. The light then passes through a slit 0.006" wide which limits the length of the spot impinging on the film. Fig. 4 illustrates the functional aspects of this optical system. The color filter system 30 may take a variety of forms such as a gelatin film or gelatin-covered glass plate, segments of which are dyed with colors in such a way that each of the individual mirrors 6b—11b is illuminated by light of a different color represented by the contrastingly-colored segments 30a, 30b, 30c, 30d, 30e and 30f.

The light source for the system is represented at 16 as supported in socket 17 by a bracket 18 mounted on frame 2. A connector plate 19 is mounted on frame 2 to complete the circuit connections to all the components installed in the galvanometer unit including the light source 16, the driving motor 20, and the galvanometer system 3. The light source 16 directs light into the optical system consisting of an assembly of an integrally-cemented lens-prism assembly 31, the purpose of which is to direct a collimated beam of light from the galvanometer mirrors 6b—11b from which are reflected individual beams of light through the window 15 and the registered windows 22 of oscillograph casing 2 and window 34 of camera casing 1 into the film magazine 26 of color film camera 1 through optical system 32. Optical system 32 is disposed in the path of optical slit 52 providing an exposure slot for the light upon film 42.

The motor 20 through a worm and wheel 34 drives the shaft 23 journaled in oscillograph casing 2 at 35 and 36 which through another worm 37 and wheel 38 drives the gear 24 journaled in oscillograph housing 2. Gear 24 meshes with a coacting similar gear 39 journaled in the film magazine 26 to operate coacting pinion 40 and the toothed sprocket 41 over which the recording film 42 passes. Film 42 is rolled from supply roll 43 to take up roll 44. Knurled finger control knobs project from the ends of the rolls and sprocket to facilitate feeding of the film manually when setting up the oscillograph preparatory for recording.

For ease in analysis, it is desirable to have a uniform time base for the record. For this purpose I provide a physically small fractional horsepower driving motor 20 including an integral governor having a substantially flat speed-load and speed-voltage characteristic. The use of such a motor produces the desired linear time base without additional components. The motor initially chosen to drive the film was designed for operation at a nominal terminal voltage of six volts; however, since the film presented a rather heavy load to the motor and since the battery voltage tends to drop during the run, the motor was rewound so that rated speed would be obtained at 4.5 volts. With this modification, the motor is able to drive the film at a constant speed of 0.75" per second with good speed regulation during the entire run. In order to reduce objectionable sparking of the contacts of the centrifugal governor, a pair of 100-ohm resistors was strapped across the contacts. This value satisfactorily reduces the interference fed back through the power line, while having a negligible effect on the speed control of the motor.

The film magazine 26 containing 50 feet of film (sufficient for a 13-minute run) is attached to the oscillograph casing 2 by means of a pair of snap clips 45 and 46 and centering pins 47 and 48 which permit ready removal of the magazine to the darkroom. Driving is achieved by means of the pair of spur gears 39 and 24 which mate as the magazine is installed. The camera housing 1 has plate member 50 thereon which contains the aperture 34. Plate member 50 is chamfered or cut away at 50a at an angle directed toward the camera casing. This enables the camera casing 1 to slide while angularly displaced from the oscillograph casing 2 to a position beneath the oscillograph casing 2 in a transverse direction with the cut away or chamfered portion 51a of downwardly depending or offset plate or wall 51 of oscillograph housing 2 forming a transverse abutment and fulcrum. In this position the aperture or window 22 in plate or wall 51 of casing 2 registers with the aperture or window 34 in plate 50 of casing 1, enabling the light beams to pass through optical system 32 and optical slit 52 and register upon film 42. When thus aligned the casing 1 is oriented toward casing 2 and pins 47 and 48 passed through apertures 45a and 46a in oscillograph casing 2 and engaged in the resilient snap clips 45 and 46 carried within the oscillograph casing 2. Pins 47 and 48 when engaged in snap clips 45 and 46 detachably retain the camera 1 on the oscillograph 2. Although there is no shutter, only a small section of the film is exposed when the magazine is removed for developing, since the pressure plate 52a holding the film firmly against the exposure plate serves as sufficient baffle to prevent general fogging of the film. The pressure plate 52a is formed on the end of frame 32a that carries the optical system 32 and coacts with the spring plate 52b urged by spring 52c for maintaining film 42 into register with optical slit 52.

Fig. 12 illustrates the type of film record which is ultimately obtained by the recording method of this invention. The multiplicity of variables which are applied to the several channels of the oscillograph constituting galvanometer coils 6c, 7c, 8c, 9c, 10c and 11c react with the magnetic fields produced by windings 6d, 7d, 8d, 9d, 10d, and 11d, and variably operate mirrors 6b, 7b, 8b, 9b, 10b and 11b producing traces of light on the sensitized color film 42 which, through the action of the filter system 30, result in the green curve 53, the brown curve 54, the orange curve 55, the red curve 56, the purple curve 57, and the blue curve 58. On the film 42 these differently colored curves can be readily identified independently one from another. Because of the impossibility of illustrating the curves in color on the patent drawing I have adopted the symbols illustrated in Fig. 13 for reproduction of the curves in Fig. 12, according to the color chart represented in Fig. 13. It will be understood, however, that the curve of Fig. 12 is reproduced in colors and clearly distinguishes the several curves throughout the entire chart thereby simplifying the reading thereof. Also, the colors chosen for illustration are entirely arbitrary and other colors which will reproduce well on the color film may be employed for their color contrast values. Magenta reproduces particularly well on the color film in contrast to other colors.

The system of this invention has been found very effective in important military developments where many correlated variables must be analyzed in order to adjust electrical circuits and mechanical devices to operate in a prearranged manner. The contrastingly colored curves have facilitated study and rapid analysis of the performance of self-controlled missiles under actual operational conditions. In addition to such military applications, this invention has numerous practical applications in laboratory and other systems of recording where numerous variables must be studied and analyzed.

While a preferred embodiment of the invention has been disclosed for purposes of illustration, it is understood that no limitations upon the invention are intended other than may be imposed by the scope of the appended claims.

What is claimed is:

1. A photographic recording apparatus comprising a film casing having an exposure aperture in one side thereof, a film reel system mounted for rotative movement within said film casing and driven by gear means adjacent one side thereof, a film driven by said film reel system, an oscillograph casing terminating in a centrally offset wall at one side thereof including a light aperture and a transversely extending undercut rail, a plate carried by said film casing surrounding the exposure aperture therein and terminating in a chamfered edge portion operative to engage the transversely extending rail formed in said offset wall and adapted to be oriented toward said oscillograph casing for aligning said light exposure aperture in said film casing with the light aperture in said wall, and means adjacent the end of said film casing remote from the undercut rail of said wall detachably connecting said film casing with said oscillograph casing, said film casing being orientable about said undercut rail as a fulcrum in establishing connection or disconnection with said oscillograph casing and means within said oscillograph casing engaging the gear means in said film casing for driving the film reel system when said film casing is engaged with said oscillograph casing.

2. A photographic recording apparatus comprising an oscillograph casing terminating in a light aperture plate at one side thereof, said plate having a light aperture therein and a transverse linear recess at one edge of said plate, adjacent said light aperture, said casing having symmetrically disposed apertures therein in a position adjacent one end of said casing remote from said linear recess, snap spring members mounted in said oscillograph casing in alignment with the symmetrically disposed apertures therein, a film casing terminating at one side thereof in a light aperture plate having a light aperture therein and a linear transverse edge adjacent thereto engageable into said linear recess as a fulcrum and transversely slidable therein and orientatable with respect thereto for presenting said last mentioned light aperture into alignment with said first mentioned light aperture and a pair of spaced prongs carried by said film casing and projectable through the symmetrically disposed apertures in said oscillograph casing as said film casing is oriented toward said oscillograph casing, said prongs being engageable in said snap spring members for detachably maintaining said casings in abutting relation.

3. A photographic recording apparatus as set forth in claim 2 in which said oscillograph casing includes a driving motor and a gear system and wherein said film casing includes a gear system for driving a film reel system therein, the gear systems in said oscillograph casing and in said film casing being meshed when said film casing is mounted in position on said oscillograph casing for driving said film reel system from the driving motor in said oscillograph casing.

4. A photographic recording apparatus as set forth in claim 1 in which the means adjacent the end of the film casing remote from the undercut rail of said wall detachably engaging said film casing with said oscillograph casing comprises a pair of spaced prongs transversely aligned with respect to said casings and spanning the distance between said casings and spring means within one of said casings for resiliently engaging said prongs for maintaining said casings in detachable juxta-position.

ARTHUR N. BUTZ,
*Executor of the Estate of Arthur Nelson Butz, Jr., Deceased.*

REFERENCES CITED

The following references are of record in the file of this patent:

UNITED STATES PATENTS

| Number | Name | Date |
|---|---|---|
| 919,467 | Robinson | Apr. 27, 1909 |
| 1,794,685 | Hayman et al. | Mar. 3, 1931 |
| 1,798,689 | Legg | Mar. 31, 1931 |
| 1,958,897 | Leyland | May 15, 1934 |
| 2,102,695 | Gieskieng | Dec. 21, 1937 |
| 2,136,143 | Michaelis | Nov. 8, 1938 |
| 2,196,166 | Bryce | Apr. 2, 1940 |
| 2,220,474 | Bryce | Nov. 5, 1940 |
| 2,267,356 | Ritzmann | Dec. 23, 1941 |
| 2,269,414 | Woods | Jan. 6, 1942 |
| 2,293,349 | Martin et al. | Aug. 18, 1942 |
| 2,358,327 | Harris | Sept. 19, 1944 |
| 2,546,540 | Gruben | Mar. 27, 1951 |

OTHER REFERENCES

"Instruments," Article by Leiss, Nitchie & Underhill, vol. 20, No. 8, pp. 709, 710 and 711, August 1947.